US011809469B1

(12) United States Patent
Imam et al.

(10) Patent No.: US 11,809,469 B1
(45) Date of Patent: Nov. 7, 2023

(54) INTELLIGENT INCLUSION/EXCLUSION OF DOCUMENTS VIA MACHINE LEARNING

(71) Applicant: SAP SE, Walldorf (DE)

(72) Inventors: Mohd Danish Imam, Bellary (IN); Devendra A M, Bellary (IN); Ajay Krishna Uniyal, Kumalda (IN); Kumar Priyam, Bellary (IN)

(73) Assignee: SAP SE, Walldorf (DE)

( * ) Notice: Subject to any disclaimer, the term of this patent is extended or adjusted under 35 U.S.C. 154(b) by 30 days.

(21) Appl. No.: 17/746,037

(22) Filed: May 17, 2022

(51) Int. Cl.
 *G06F 16/33* (2019.01)
 *G06F 16/332* (2019.01)
 *G06F 3/0482* (2013.01)
 *G06N 20/00* (2019.01)

(52) U.S. Cl.
 CPC ........ *G06F 16/3328* (2019.01); *G06F 3/0482* (2013.01); *G06N 20/00* (2019.01)

(58) Field of Classification Search
 CPC .... G06F 16/3328; G06F 3/0482; G06N 20/30
 See application file for complete search history.

(56) References Cited

U.S. PATENT DOCUMENTS

| 2005/0234688 A1* | 10/2005 | Pinto ...................... G05B 17/02 703/13 |
| 2020/0387553 A1* | 12/2020 | Tyulyaev ............ G06F 18/2413 |

\* cited by examiner

*Primary Examiner* — Loc Tran
(74) *Attorney, Agent, or Firm* — Buckley, Maschoff & Talwalkar LLC (57) ABSTRACT

Provided are a system and method that use machine learning to identify documents to be excluded from a report or included in a report of a software application. In one example, the method may include receiving document data of a set of documents assigned to a report, executing the machine learning model on the received document data which identifies a document assigned to the set of documents that is to be excluded from the report, displaying, via a user interface, a set of line items corresponding to the set of documents, respectively, activating a user interface element of the identified document within a line item of the identified document, and in response to detecting a selection of the activated user interface element via the user interface, accepting the exclusion of the identified document from the report and move the identified document to a different report.

20 Claims, 11 Drawing Sheets

| Reporting Period | Due Date | Status | Last Modified By | Last Modified On |
|---|---|---|---|---|
| Apr 1 – Apr 30 | April 30 | Completed | User_9 | April 30 |
| May 1 – May 31 | May 31 | In Process | User_4 | May 22 |
| Jun 1 – Jun 30 | June 30 | Not Started | | |
| Jul 1 – Jul 31 | July 31 | Not Started | | |
| Aug 1 – Aug 31 | Aug 31 | Not Started | | |
| Sep 1 – Sep 30 | Sep 30 | Not Started | | |

FIG. 2C

| Document Status | Document ID | Type | Fiscal Year | Due | Suggestion | Confidence | Predicted Date |
|---|---|---|---|---|---|---|---|
| ✓ | 111567 | CRED | 2022 | May 31 | ✗ Exclude | 95.2 | Jun 30 |
| ✓ | 111903 | CRED | 2022 | May 31 | ✗ Exclude | 91.9 | Jun 30 |
| ✗ | 111114 | DEB | 2022 | Jun 30 | ✓ Include | 87.2 | May 31 |
| ✗ | 111115 | DEB | 2022 | Jun 30 | ✓ Include | 85.3 | May 31 |
| ✗ | 112054 | INV | 2022 | May 31 | ✓ Include | 81.2 | May 31 |
| ✓ | 110890 | INV | 2022 | May 31 | ⓘ No Action | 98.4 | |
| ✓ | 111227 | INV | 2022 | May 31 | ⓘ No Action | 97.2 | |
| ✓ | 111363 | INV | 2022 | May 31 | ⓘ No Action | 96.6 | |
| ✓ | 111449 | DEB | 2022 | May 31 | ⓘ No Action | 96.1 | |
| ... | ... | ... | ... | ... | ... | ... | ... |

ACCEPT ALL

| Document Status | Document ID | Type | Fiscal Year | Due | Suggestion | Confidence | Predicted Date |
|---|---|---|---|---|---|---|---|
| ✓ | 111567 | CRED | 2022 | May 31 | ✗ Exclude | 95.2 | Jun 30 |
| ✓ | 111903 | CRED | 2022 | May 31 | ✗ Exclude | 91.9 | Jun 30 |
| ✗ | 111114 | DEB | 2022 | Jun 30 | ✓ Include | 87.2 | May 31 |
| ... | ... | ... | ... | ... | ... | ... | ... |

Log File
322

INTELLIGENT INCLUSION/EXCLUSION OF DOCUMENTS VIA MACHINE LEARNING

BACKGROUND

Organizations that conduct business in a jurisdiction (e.g., a state, a country, etc.) typically are required by the laws of the jurisdiction to provide documentation/reports that detail the organization's financial activities within the jurisdiction. The document serve as proof that the organization is complying with the laws, including the tax laws. When an organization conducts business in multiple jurisdictions, that organization has to submit separate reports/document to each of the jurisdictions based on the different requirements of those jurisdictions. Keeping track of the subtle nuances of the different tax laws among the different jurisdictions can be a daunting task. Typically, such a task is performed by a human. When the organization has to comply with multiple jurisdictions, the organization usually needs multiple people and multiple services to provide the documentation in the jurisdictions.

In some cases, an organization may rely on a software application to organize the documents for different jurisdictions. For example, a user may upload documents such as invoices, credit memos, debit memos, and the like, to be submitted for proof of compliance for accounting purposes. Here, an accountant (or other experienced professional) must review the details of each document (sometimes even opening it) to determine whether or not the document should be included in the reporting period for the particular jurisdiction. When there are thousands or even tens of thousands of documents to report, this process can take a significant amount of time for a person because they must view the details of each document and make a decision.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 5 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Organizations throughout the world create, generate, and submit compliance reports in to authorities/agencies along with documents required by the jurisdictions. The compliance reports are electronic reports (i.e., digital reports) that need to be transmitted electronically to a computing device of the authority via an electronic computer network. In the examples herein, a document refers to an electronic document (i.e., a digital document). The document may have a format of an eXtensible Markup Language (XML), a Portable Document Format (PDF), text file (TXT), JavaScript Object Notation (JSON), comma separated values (CSV), an eXtensible Business Reporting Language (XBRL), and the like. Before generating the electronic reports, the user (e.g., accountant, etc.), may move one or more items between reporting periods by changing the reporting date via a user interface that is output electronically as part of a software application for managing reporting. The reasons for changing the reporting periods may be because of an erroneous posting, erroneous business process, incorrect master data, waiting for clarification from business partner, or the like.

The movement of documents can consist of either inclusion of a document to current reporting period of an electronic report, or exclusion of a document from current reporting period of the electronic report to a reporting period in the future, or both. To do the inclusion, exclusion of a digital document in current or future reporting period the user must typically identify these documents on their own. This process is subject to a number of deficiencies and drawbacks. Depending on the size of the business there may be thousands of electronic documents represented by thousands of line items on the screen of a computing device, respectively, which the user must look at to manually identify which line items need to be included, excluded, or left as it is before creating the report. The process of identifying the relevant documents is manual and prone to errors. Searching through the list of documents (line items on the screen) to look for the relevant documents is a time-consuming process. Furthermore, each relevant line item's reporting date need to be changed manually which is cumbersome. The manual adjustment needs to be done at each document level separately.

The example embodiments are directed to a host system (e.g., a software application hosted on a server or other device) which overcomes the drawbacks of the traditional electronic document modification process that is performed by a user via a reporting software application. In particular, the host system may already provide accounting services and reporting services for purposes of compliance via such a reporting software application. According to various embodiments, a self-learning system (e.g., a machine learning model, etc.) may self-learn from the exclusions/inclusions of electronic documents performed by the user, such as via the user interface of the software application, which may be incorporated into the software application and used to automatically recommend documents for inclusion or exclusion.

In the example embodiments, the host system may receive a list of documents for a current reporting period and automatically recommend exclusions/inclusions of documents with respect to the current reporting period via execution of the machine learning model. For example, the machine learning model may identify when a document assigned to the current reporting period should be moved to a different reporting period, such as a future reporting period. The machine learning model may also identify the future reporting period as well. As another example, the machine learning model may identify when a document that is assigned to a different reporting period (e.g., a future reporting period, etc.) should be included in the current reporting period. The recommendations can be provided to a user along with an option for automatically implementing the changes.

According to various embodiments, the host system may also generate and display an interactive user interface with content items that are activated based on which documents are suggested for exclusion or inclusion. For example, a document recommended for inclusion in the current reporting period may be labeled with an interactive UI element which when selected automatically incorporates the document into the current reporting period, and modifies the underlying data tables/storage to reflect the new due date (e.g., the last day of the current reporting period, etc.)

As another example, a document recommended for exclusion from the current reporting period may be labeled with an interactive UI element which when selected automatically removes the document from the current reporting period, and modifies the underlying data tables/storage to reflect the new due date (e.g., the last day of a future reporting period where the document is moved to, etc.) In some embodiments, the host platform may list other documents that are assigned to the current reporting period and which no action is recommended for. These documents may be labeled with non-interactive elements that tell the user no action is needed. There may not be a clickable element with these documents making it easy for the user to understand which documents action is recommended for.

In some cases, an exclusion from one reporting period may create an inclusion in another reporting period when the machine learning model determines to transfer the document from one report to another report. As another example, an exclusion from a reporting period may not result in an inclusion within another report. For example, a user may not prefer and/or a jurisdiction may not require certain documents to be submitted. In this case, the exclusion may be the only action.

According to various embodiments, the host system may log data from manual changes performed by a user and use the logged changes to train the machine learning model. The log may be stored within a database, a database table, an index, a file, a document, or the like, where the host platform can read and write details to memory about changes to the documents made by the user. As another example, the system may auto-recommend inclusions/exclusions of documents within a reporting period to the user via the interactive user interface. The user may click a button or the like to accept/decline the auto-recommend inclusions/exclusions. In response, the host system may log both the recommend changes and the user's decision with respect to the changes via a log file. The log file can then be used to re-train the machine learning model thereby performing reinforcement learning based on the system's own data. In the examples herein, a log file may be used to record the document changes and the user's decisions, however, embodiments are not limited thereto. The log file may be replaced with a database, a database table, a document, a file such as a Word document, a JSON document, an XML file, or the like. The log is used to store details for later analysis by a machine learning model or models.

Figure 1A:
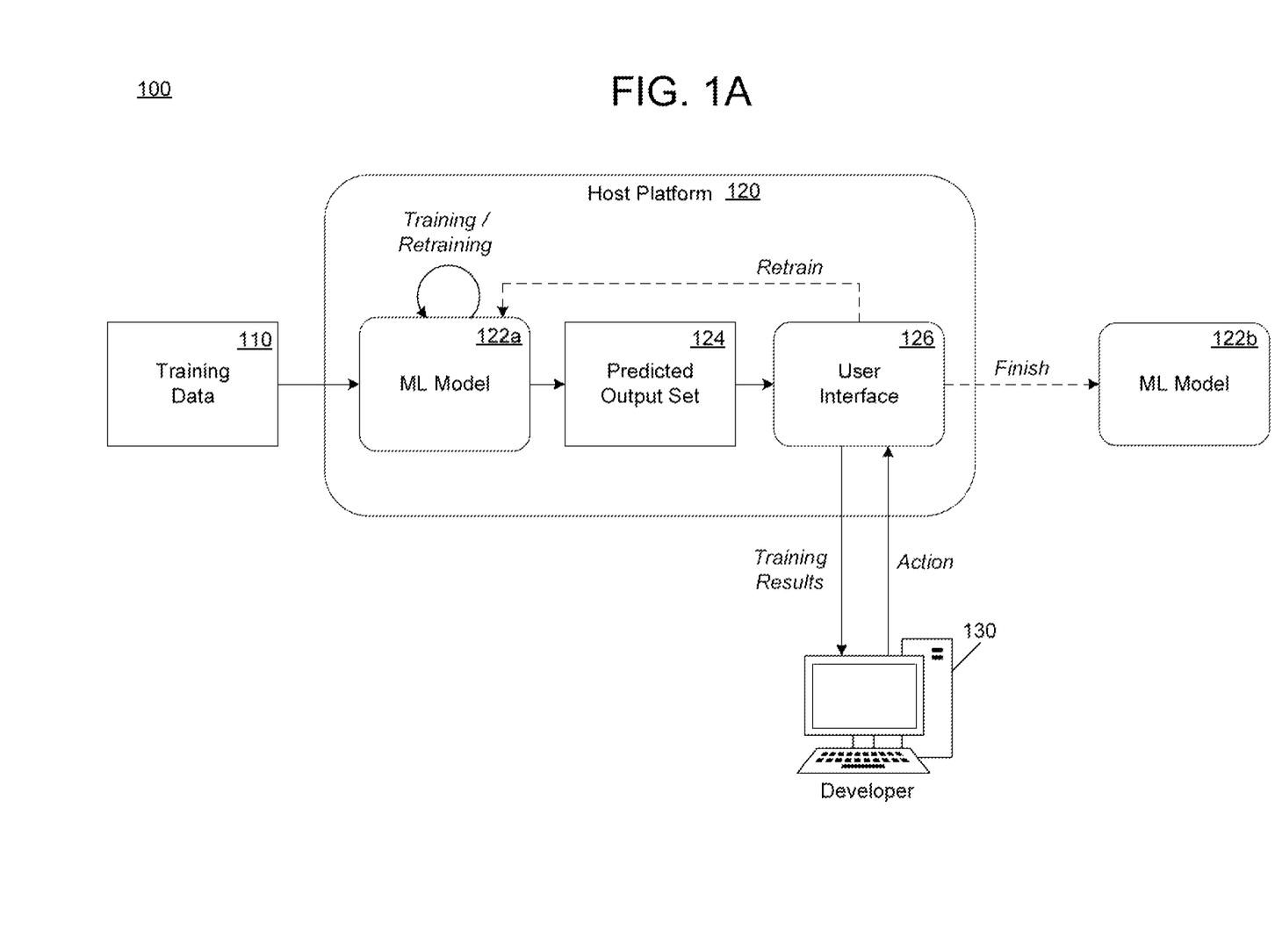
FIG. 1A is a diagram illustrating a process of training a machine learning model in accordance with an example embodiment.
Figure 1B:
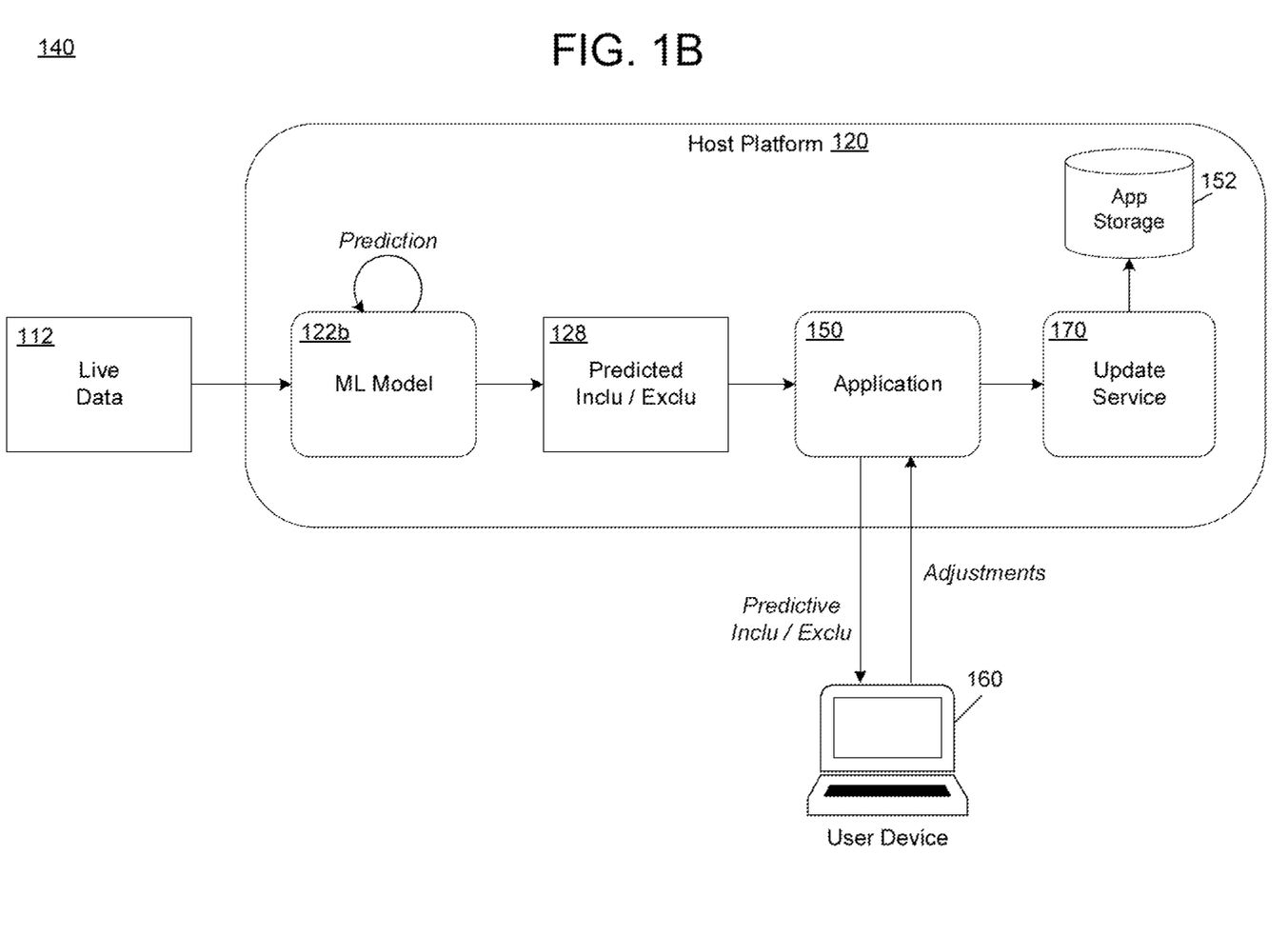
FIG. 1B is a diagram illustrating a process of making a prediction via the trained machine learning model in accordance with an example embodiment.
Figure 1C:
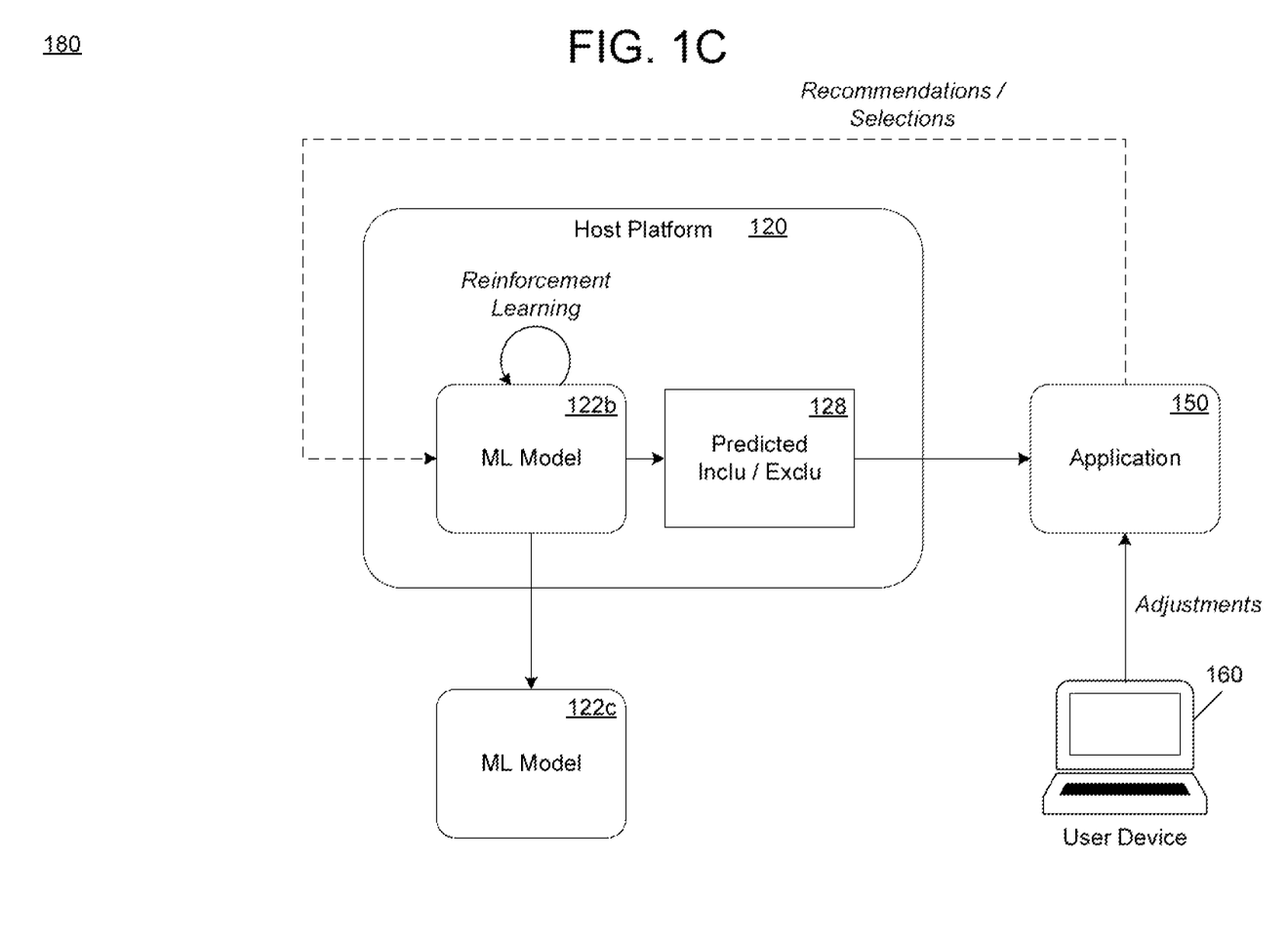
FIG. 1C is a diagram illustrating a process of performing reinforcement retraining on the machine learning model in accordance with an example embodiment.

FIG. 1A illustrates a process 100 of training a machine learning model 122a in accordance with an example embodiment, FIG. 1B illustrates a process 140 of making a prediction via the trained machine learning model in accordance with an example embodiment, and FIG. 1C illustrates a process 180 of performing reinforcement retraining on the machine learning model based on the prediction and a user interaction in accordance with an example embodiment.

Referring to FIG. 1A, a host platform 120 is shown which includes a development environment, for example, an integrated development environment (IDE) or the like where machine learning models can be developed. The host platform 120 may include an application server, a web server, a mobile application host server, a database, a cloud platform, an on-premises server, and the like. The host platform 120 may receive a training data set 110 with historical inclusions and/or exclusions of documents within respective reporting periods. Here, the training data set 110 may include line items representing the documents. For example, each line item may represent a different document and include attributes of each document such as a document ID, type, last modified by, last modified on, reporting period attributes, etc. The training data set 110 may also include identifiers of documents that were changed (i.e., included or excluded). These changes may be performed by a user via a user interface and logged by the host platform 120 as further described in the examples of FIGS. 3A-3B.

According to various aspects, the host platform 120 may train the machine learning model 122a based on historical data of already included and excluded items for reporting within the training data set 110. The machine learning model 122a learns over a period and derives the rules that can be used to predict which documents should be included or excluded from a reporting period. The system then presents a predicted output set 124 to a developer 130 via a user interface 126. If approved, the host platform 120 may transfer a machine learning model 122b to a live execution environment.

The training process may be repeated a number of times and debriefed by the host platform 120 to provide the developer 130 with an understanding of the variables and aspects of the model that are affected by the training. When the developer 130 is happy, the developer 130 may use the user interface 126 to transfer the machine learning model 122b from the learning environment to a live runtime environment hosted by the host platform 120.

Referring now to FIG. 1B, the machine learning model 122b is running in a live runtime environment of the host platform 120. Here, the machine learning model 122b may be incorporated into a software application 150 or suite of applications such as accounting software, enterprise resource planning (ERP) software, or the like. A user may use a user device 160 to connect to and interact with the software application 150 causing the software application to call (e.g., via an API call, etc.) the machine learning model 122b to make a prediction based on document data included within reporting periods of the software application 150. Here, the user device 160 may connect to the host platform 120 via the Internet and consume the software application 150 via a mobile application, web application, or the like. Next, the user may upload live data 112 to the application which is then input into the machine learning model 122b.

According to various embodiments, the machine learning model 122b may receive input data from the software application 150 and predict at least one of a document to be included in a current reporting period or a document to be excluded from the current reporting period of the software application 150. The input data may include document data such as a list of documents of a current reporting period and/or documents from one or more other reporting periods. The input data may be provided with the API call from the software application 150. In response, the host platform 120 may execute the machine learning model 122b on the input data to create a predicted output 128 that includes one or more documents to be excluded from a current reporting period and/or one or more documents to be included in the current reporting period. In addition, the predicted output 128 may include a prediction confidence of each suggested inclusion or exclusion.

The designed system provides the user device 160 with a user interface that allows the user to accept the predicted result set above a threshold. All the documents (which may be displayed as line items) with prediction confidence value greater than threshold value are accepted and the changes are made for the reporting period, the relevant documents with a confidence level above the threshold value set by the user are included or excluded from the reporting period based on the predicted value. If a document needs to be excluded from the current reporting period, the system also predicts the reporting date in the future that the document should be moved to thus automatically updating the due date of the document with a due date of the new reporting period such as the last day of the month, quarter, year, or the like.

The predicted output 128 may be provided to the software application 150. Here, the software application 150 may be used by the user to accept/reject the auto-recommended inclusions and/or exclusions. Any changes accepted by the user may be updated within an application storage 152 of the application within the host platform 120 via an update service 170. For example, the update service 170 may update table data, document data, or the like, stored within the application storage 152. The updates may include updating the due date if the document is moved to a new reporting period, within the document itself, an index, a spreadsheet, or the like.

Referring to FIG. 1C, there is a process 180 of reinforcement learning. Here, the adjustments that are accepted by the user in the process 140 of FIG. 1B, may be used to re-train the machine learning model 122b to create a reinforced model 122c. For example, the suggested inclusion or exclusion along with the user's selection to approve/disapprove may be included in the training data that is used to retrain the machine learning model 122b.

Figure 2A:
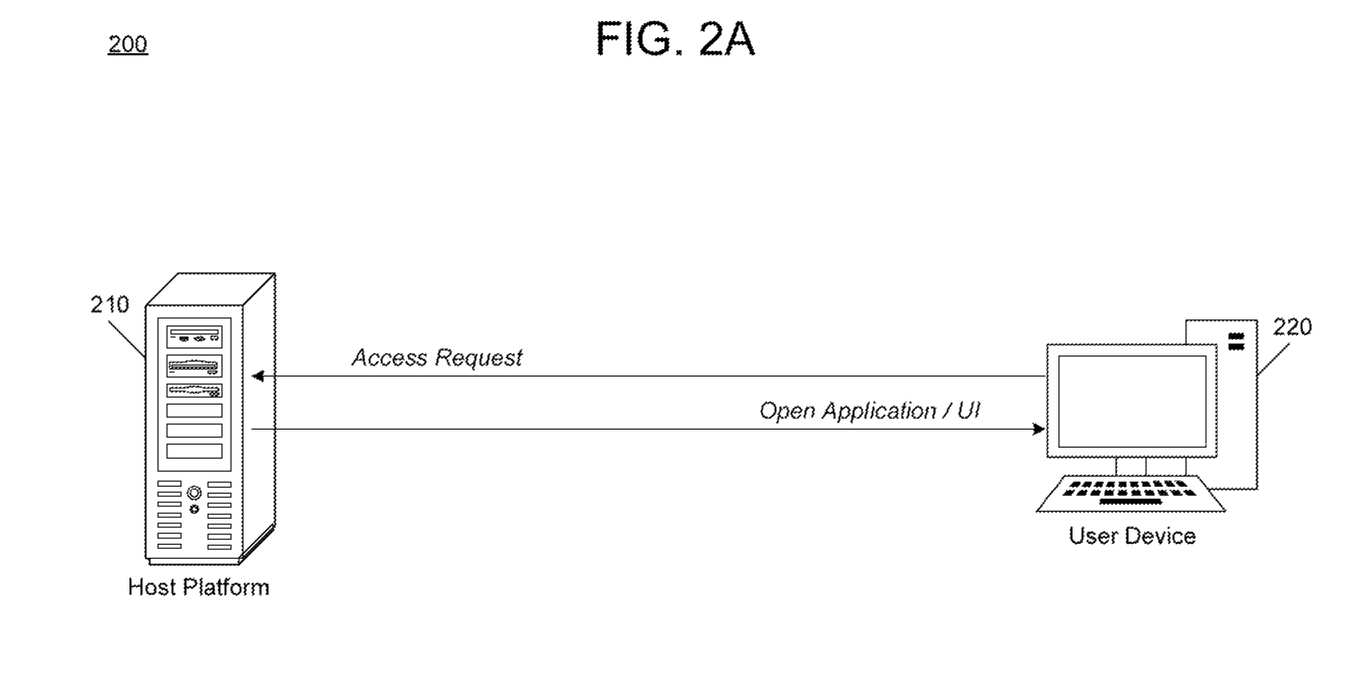
FIGS. 2A-2B are diagrams illustrating a process of opening and selecting a report via a software application in accordance with example embodiments.
Figure 2B:
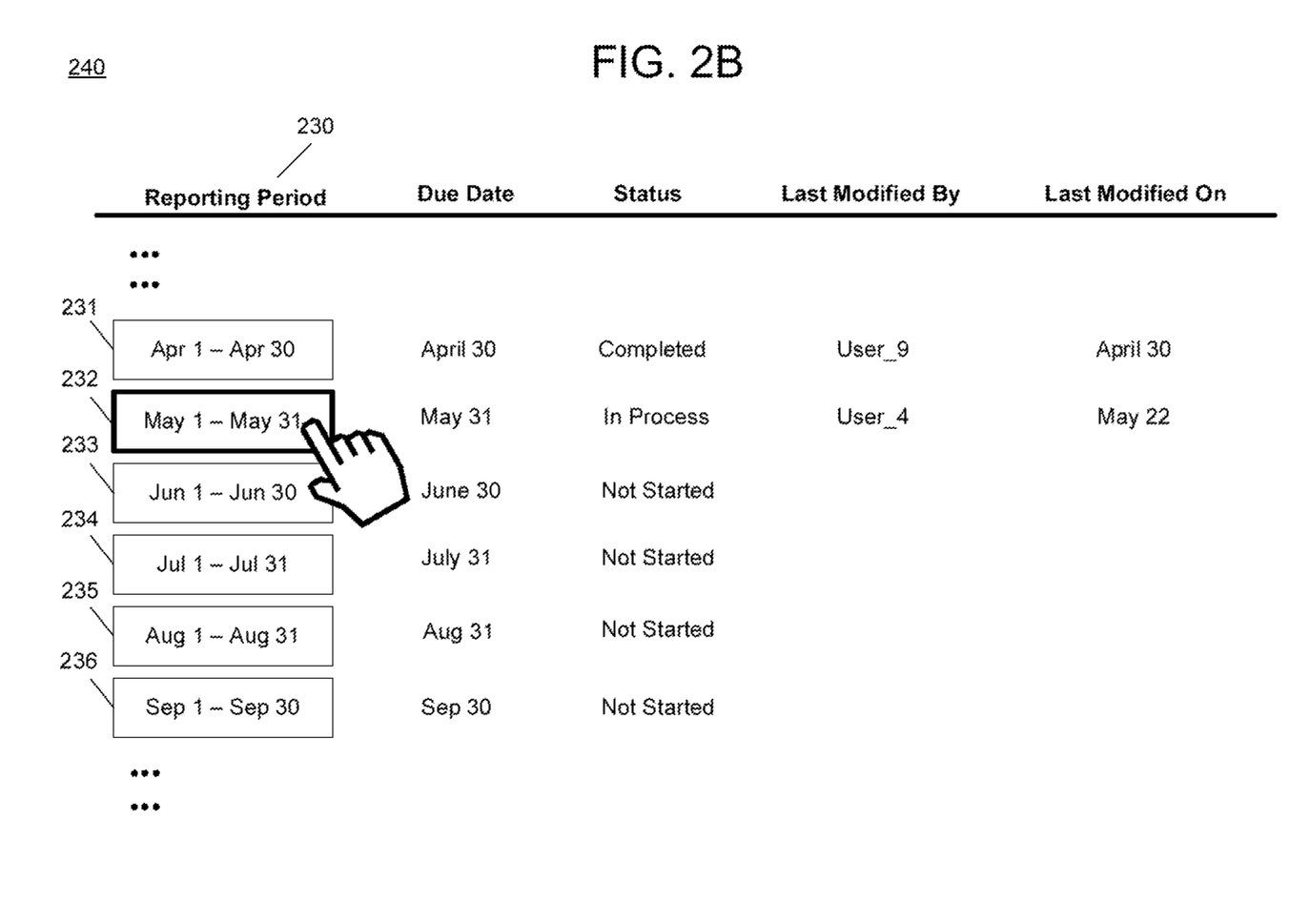

FIGS. 2A-2B are diagrams illustrating a process of opening and selecting a report via a software application in accordance with example embodiments. For example, FIG. 2A illustrates a process 200 of a user using a user device 220, such as a smartphone, tablet, desktop computer, smart-wearable, laptop, or the like, to connect to a host platform 210 via a network such as the Internet to establish a secure communication channel. In this example, the host platform 210 may host a software application described herein such as a mobile application, a progressive web application, a locally-installed application, or the like.

The user may use the user device 220 to establish a secure/authenticated channel for communication between the user device 220 and the host platform 210 (e.g., between a web browser running on the user device 220 and a back-end application hosted by the host platform 210, etc.) In this example, the user may login or enter access credentials into a user interface being output by the host platform 210 (e.g., via a URL, etc.) to verify their identity. For example, the user may input text content, biometrics, speech commands, gestures, or the like, to establish a security session between the host platform 210 and the user device 220. Once established, the host platform 210 may identify the user's information, for example, the username, password, or the like.

FIG. 2B illustrates a user interface 240 that may be output by the host platform 210 in response to the user successfully logging into the software application on the host platform 210. For example, the user interface 240 may be instantiated or populated within a web browser or mobile application on the user device 220 based on an output by the host platform 210. In FIG. 2B, the user interface 240 includes a column 230 of identifiers 231-236 that identify different respective reporting periods of the software application. The reporting periods may correspond to reporting periods for compliance, tax purposes, accounting, and the like. In some cases, the reporting periods may be weekly, monthly, quarterly, or the like. Within these reporting periods, the organization may be required to submit a number of documents. Here, the user interface 240 may also include other data attributes of each reporting period such as due date, status (e.g., started, completed, not started, etc.), identifiers of the user who last modified the document, when the document was last modified, and the like.

In this example, the host platform 210 may create interactive user interface elements embodied as identifiers such as identifier 231, 232, 233, 234, 235, and 236. In other words, each identifier 231-236 may be clickable via a cursor, keyboard, touch input, or the like. For example, each identifier 231-236 may include a selectable area and a border surrounding the selectable area which indicates the clickable/selectable area. In response to being selected, the identifiers 231-236 may open or otherwise navigate to a respective page of the software application that includes the details of the corresponding reporting period. For example, if the user were to click on the identifier 232 corresponding to the May reporting period, the host platform 210 detect the selection via the user interface 240, and in response, generate and display the user interface shown in FIG. 2C. That is, in response to opening a reporting periods within the software application by clicking on the identifier 232, the software application loads a user interface 270 that corresponds to the May reporting period for that year.

Figure 2C:
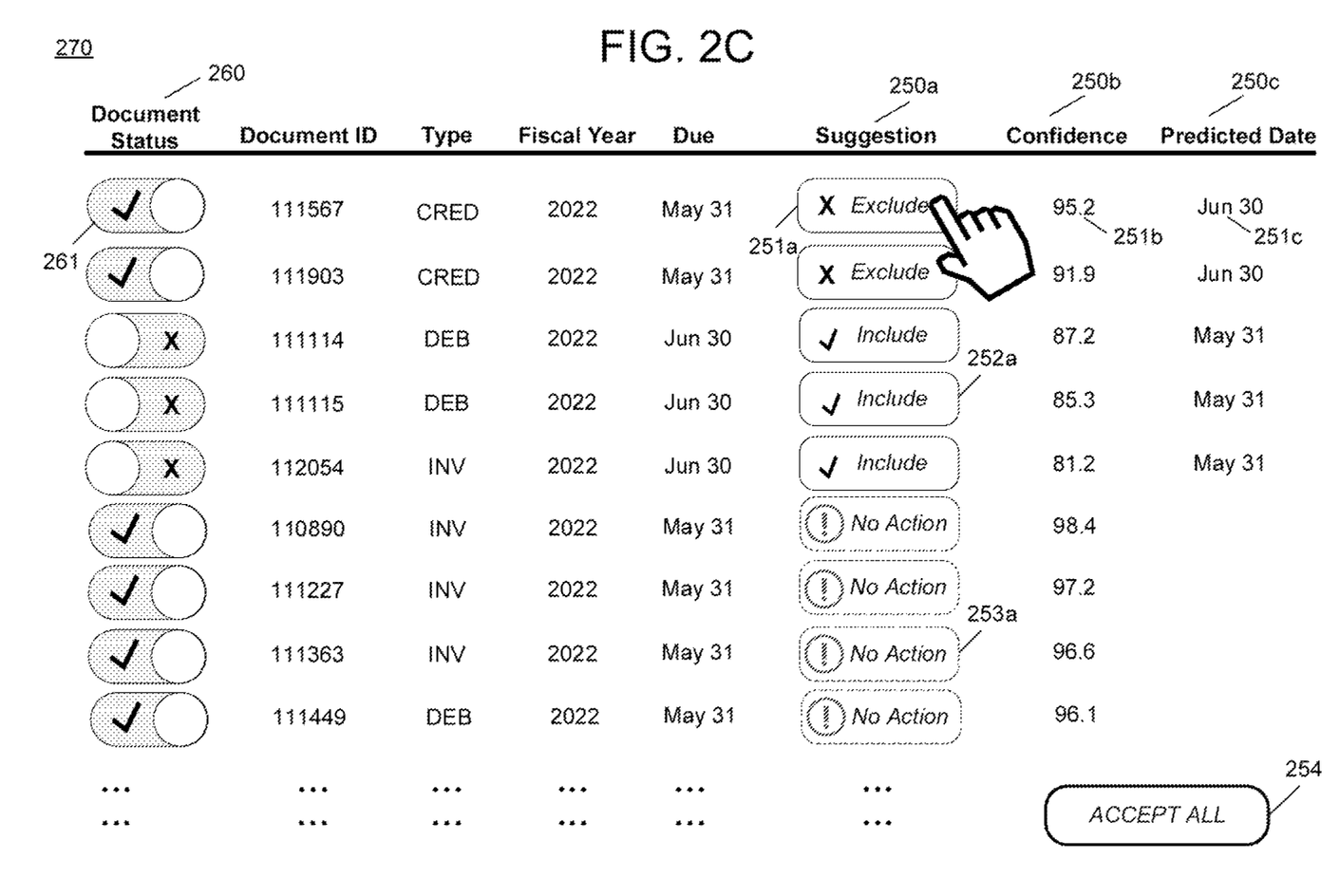
FIG. 2C is a diagram illustrating an interactive user interface with recommendations and activated UI elements in accordance with an example embodiment.

Referring to FIG. 2C, the user interface 270 includes a partial listing of the documents that are currently assigned to the May reporting period as well as three other documents having document IDs 111114, 111115, and 112054 which are currently assigned to a different reporting period but which are recommended for inclusion in the May report. This determination may be made by the machine learning model described according to various embodiments. The machine learning model may also be updated or reinforced based on subsequent recommendations made by the model, and the ultimate decision by the user on whether to accept the recommendation. Both of these values may be input back into the machine learning model for re-training.

The machine learning model may be tied to the particular user that logs into the software application in the example of FIG. 2A. For example, each individual user of the software application may have a respective machine learning model trained based on the user's particular inclusion/exclusion habits and preferences. Thus, the machine learning model may include an identifier that is linked to the particular user or user account that logs into the software application thereby enabling the host platform 210 to pull the correct model from a library of other models. As another example, the machine learning model may be trained for a particular organization, which may include multiple users under the same company or umbrella.

In FIG. 2C, each document is represented by a respective horizontal line in the user interface 270, also referred to herein as a line item. For example, each document includes a value for document status (e.g., included or excluded) identified in column 260 such as status button 261 which may be interacted with by a user to remove or add the document to the reporting period, a document ID, a document type, a fiscal year, a reporting deadline/due date, a user interface element that can be interactive or that cannot be interactive, and the like. In this example, the host platform 210 may turn on or turn off the activity of the user interface elements based on the suggestions that they represent or are labeled with.

In addition to the document details, the user interface may also display additional attributes within columns such as column 250a, 250b, and 250c, which have been determined or predicted by the host platform using a machine learning model or models. Here, the machine learning model may predict whether or not a document should be included in a current reporting period. In addition, the model may also determine a confidence value (e.g., between 0-100, etc.) of the prediction. In addition, the model may also predict a new reporting date for a document that is to be moved out of the current reporting period or moved into the current reporting period. For example, in FIG. 2C, column 250a contains interactive recommendations that represent recommendations for inclusion and exclusion of a document/line item in a current reporting period. Meanwhile, column 250b contains values for confidence of the prediction (e.g., a predicted confidence output by the model with respect to the prediction inclusion/exclusion of the document noted in the column 250a). Furthermore, column 250c contains values for a new reporting due date. In the example of an inclusion, the new reporting due date in column 250c will be the current reporting period. For an exclusion, the new reporting date in column 250c will be the predicted new reporting date determined by the machine learning model.

For example, if the machine learning model recommends an inclusion or an exclusion of a document, the user interface element for that suggestion may be interactive. Meanwhile, if the machine learning model recommends No Action, the user interface element for that suggestion may not be interactive. The host platform may dynamically make interactive some of the suggestion elements in column 250a while leaving some of the suggestion elements in column 250a as non-interactive. In the example of FIG. 2C, the suggestion elements labeled with "No Action" such as suggestion element 253a are identified with dashed lines and are not interactive. Meanwhile, the suggestion elements labeled with unbroken lines which include "Exclude" or "Include" as suggestions include interactive elements such as suggestion element 251a and suggestion element 252a. In addition, a confidence value 251b and a predicted data value 251c are displayed on the same line item with the suggestion element 251a. This may be performed for each line item where a change is recommended. For line items where no change is recommended, no values may be listed in the column 250c (or in some cases in column 250b).

If a user were to select the suggestion element via the user interface 270, the host platform 210 may update the underlying tables of storage associated with the report to reflect the new document being included, or an existing document being excluded. For example, if suggestion element 251a is selected, the host platform 210 may exclude the document from the report and update the underlying database tables/records to move the document from one reporting period to another. Likewise, the host platform 210 may automatically update the due date of the document within the table. Thus, the next time the user opens the user interface 270, an excluded document will no longer be presented and an included document will now have a reporting date of the current month of May. In addition to providing individual recommendations and individual identifiers of the recommendations, the host platform 210 may also output an "Accept All" button 254 that enables the user to accept all of the suggestions shown on the user interface 270 (and possibly not shown if there are documents below the screen that do not fit) with a click on one button.

In the examples herein, the interactive elements may be links such as hyperlinks or other graphical buttons, boxes, elements, images, logos, icons, etc., which are embedded into the user interface and which include labels thereon. A user may use a cursor or finger to select the graphical elements on the user interface and make selections, etc.

Figure 2D:
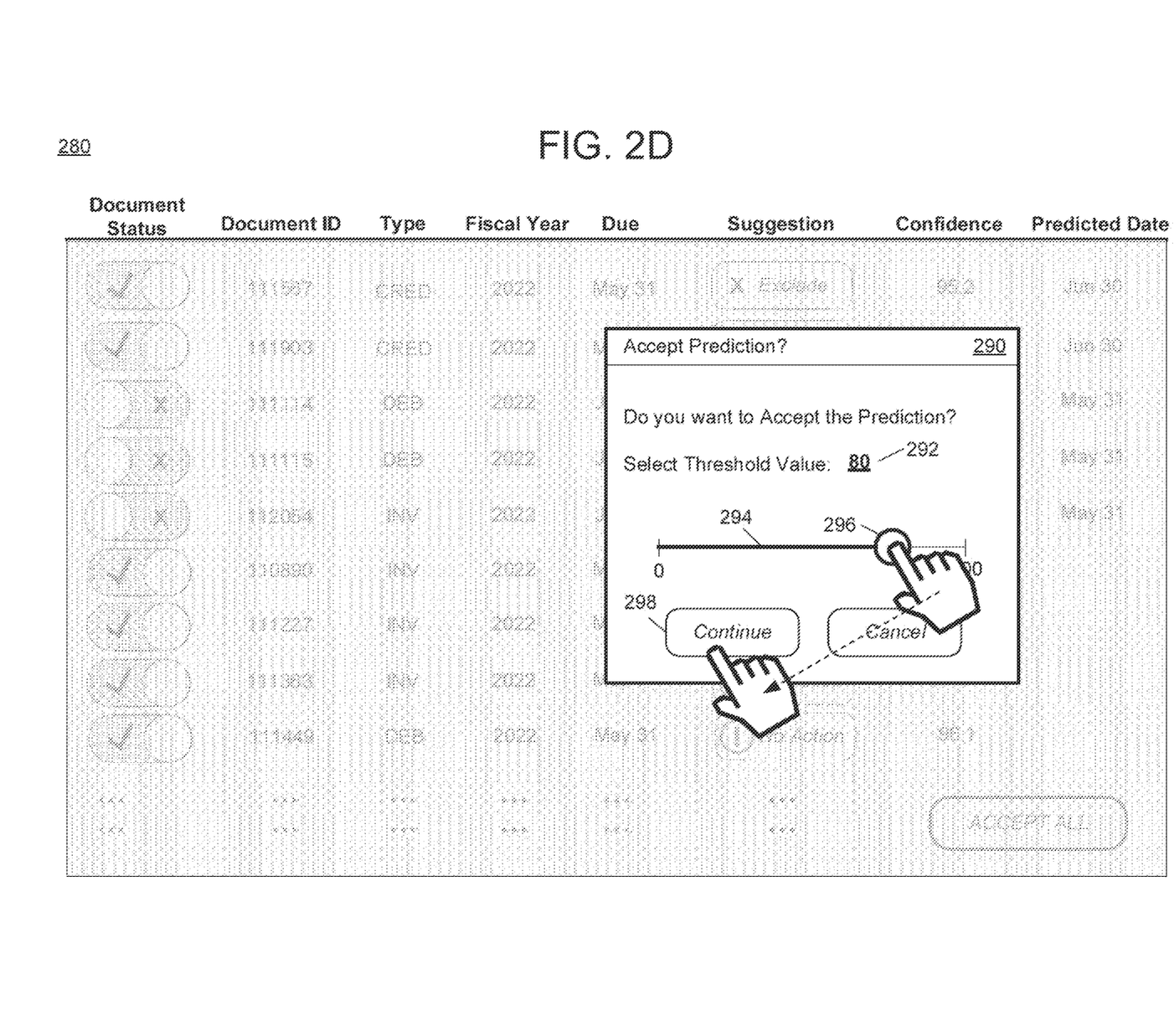
FIG. 2D is a diagram illustrating a prediction confidence user interface for accepting a prediction and modifying an acceptable confidence level in accordance with an example embodiment.

FIG. 2D illustrates a user interface 290 for accepting a prediction made by the host system and also for modifying an acceptable confidence level of a prediction in accordance with an example embodiment. The user interface 290 may include input mechanisms such as a slider, checkbox, input field, combo box, or the like, that enable a user to interact with the user interface and modify acceptable threshold levels of prediction confidence. Referring back to FIG. 2C, the user may click on or otherwise select to accept the prediction to exclude the first document on the list (document ID 111567) by selecting the suggestion element 251a on the user interface 270. In response, the host platform may darken the user interface 270 to generate a user interface 280 as shown in FIG. 2D. Here, the host platform has darkened an area 282 of the user interface that covers the underlying document content via a darkened overlay.

In addition, the host platform may output the user interface 290 with additional details about the prediction and a slider 294 with a sliding mechanism 296 that slides along the slider 294 for modifying a prediction confidence value 292 that is acceptable to the user. Here, the user has selected a prediction confidence value of 80%. Thus, any predictions with at least 80% confidence will be accepted by the system. When the user agrees to the prediction, the user may accept the prediction by clicking on a continue button 298 or the like. If the user does not wish to accept the prediction, the user may press cancel. In some cases, the user may modify the prediction confidence value 292 and accept the prediction at the same time by also manipulating the slider 294 with the sliding mechanism 296 to change the prediction confidence value 292. Here, by clicking on the continue button, the user accepts both the prediction and the updated/modified prediction confidence value simultaneously.

The user can manipulate the user interface 290 to change the thresholds for each kind of document such as an inclusion type of document or an exclusion type of document. In some cases, the thresholds may be different. For example, a user may require a prediction confidence of 90% for all inclusions and a prediction confidence of 80% for all exclusions. However, the user may also use the same confidence threshold for both inclusions and exclusions.

Figure 3A:
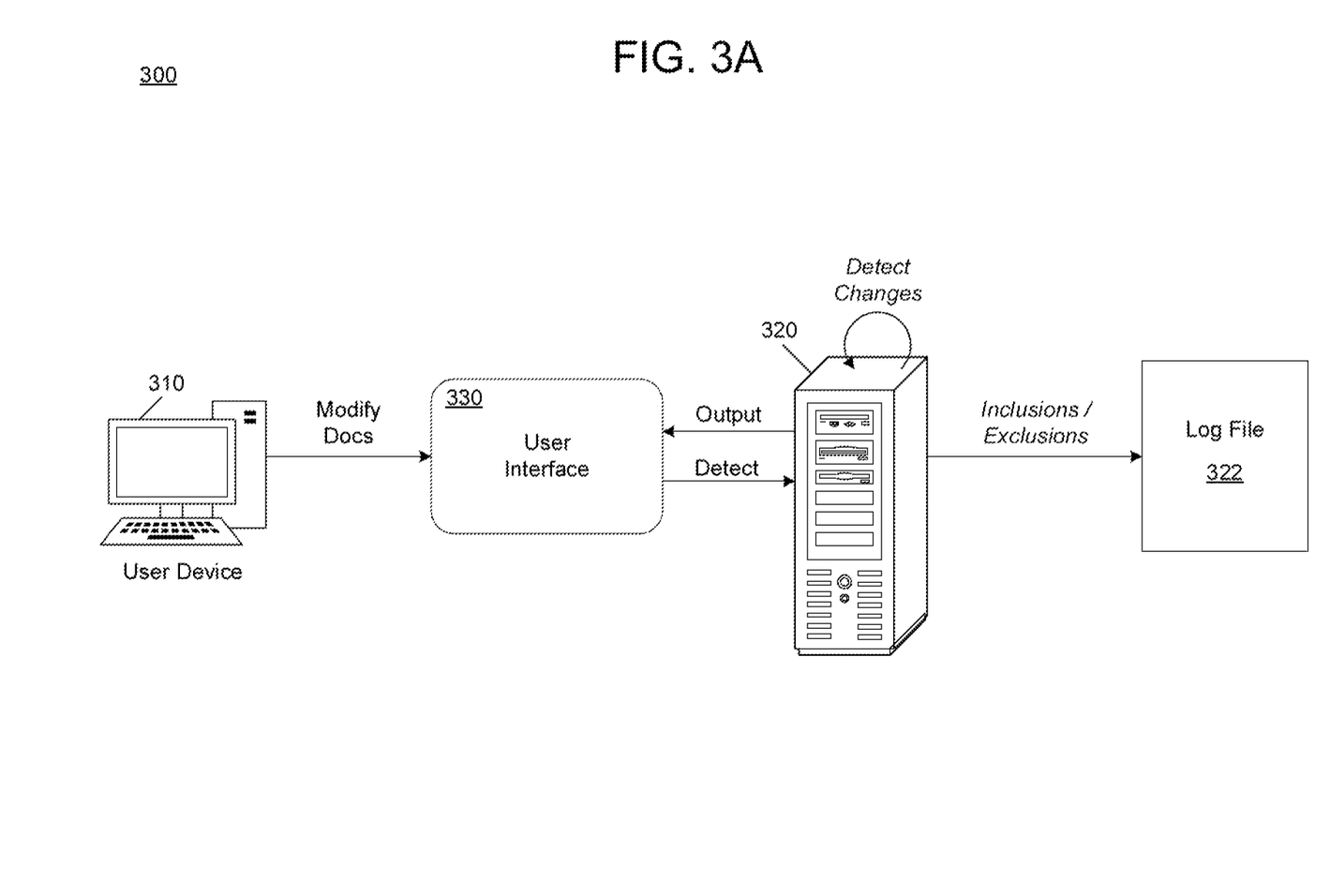
FIGS. 3A-3B are diagrams illustrating a process of capturing input data for machine learning in accordance with example embodiments.
Figure 3B:
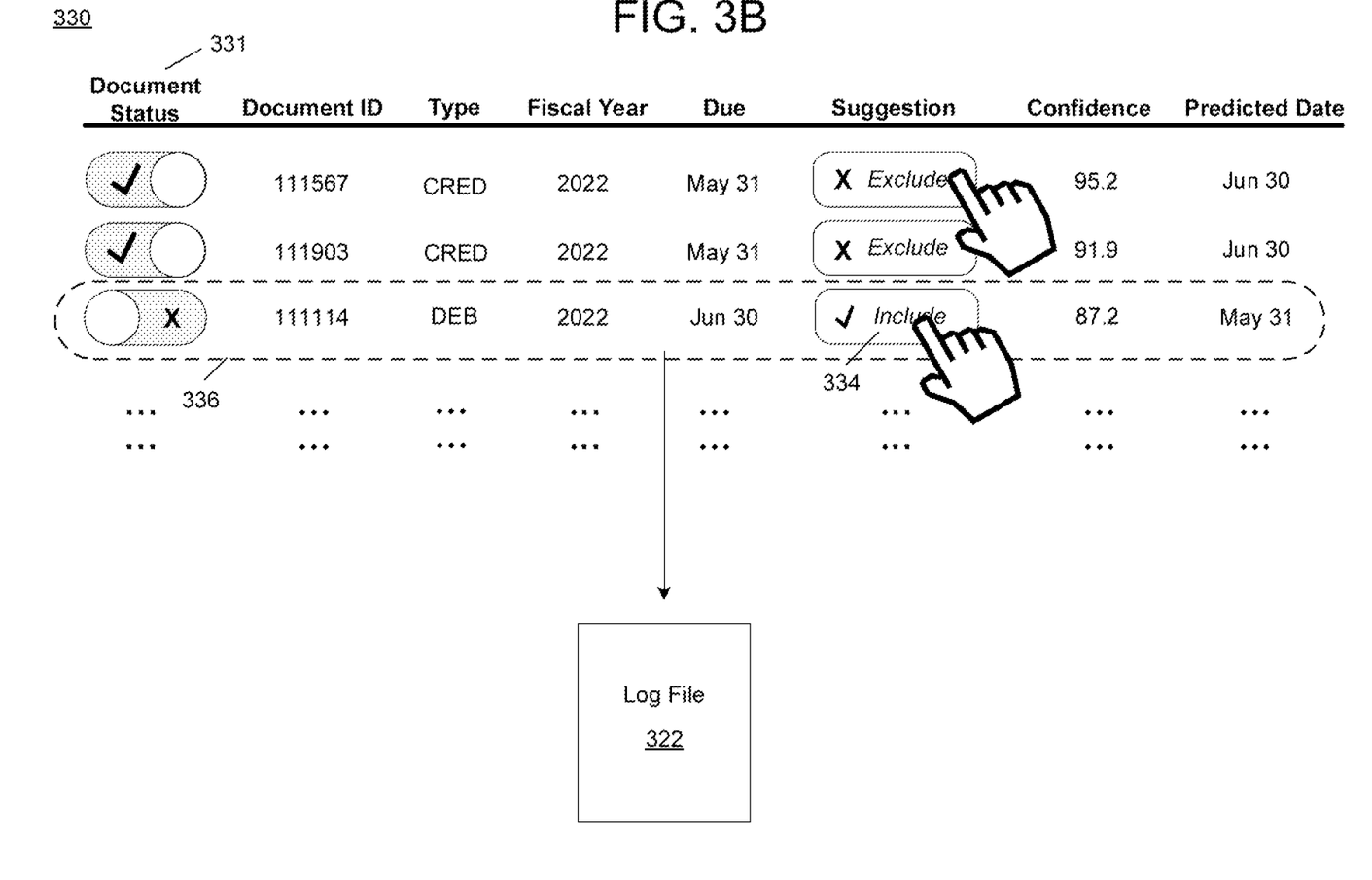

FIGS. 3A-3B illustrate a process of capturing input data for machine learning in accordance with example embodiments. In FIG. 3A, a process 300 of capturing user inputs/modifications to documents in a reporting period is shown. In this example, a host platform 320 may host a reporting software as described herein and may be accessible to a user device 310 via the Internet or other network. As noted, the reporting software may include or may other have access to a machine learning model that can make automated recommendations for including and excluding documents from a reporting period of the reporting software.

According to various embodiments, the machine learning model may be specific to a particular user or a group of users. That is, the model may be trained primarily from manual inclusions/exclusions by a particular user or by a particular group of users (such as within the same organization) to create a user-specific or organization-specific model. To create such a model, the host platform may capture manual inclusions and exclusions performed by the user device 310 via the user interface 330 and record these inclusions and exclusions within a log file 322. This process may be repeated each time the user logs into the software application. The model training may be performed periodically, regularly, intermittently, etc.

For example, the user's exclusions and inclusions may be recorded for a period of time, such as a week, a month, a year, etc., and used to train a machine learning model initially. Each subsequent month or year that the user makes additional inclusions/exclusions, including those suggested by the machine learning model and approved or denied by the user (manually) may be used to retrain the model to reinforce the learning and change along with changes in the behavior of the user/organization.

FIG. 3B illustrates the user interface 330 that may be output by the host platform 320 shown in FIG. 3A. Referring to FIG. 3B, the user interface includes document details where each document is embodied within a corresponding line of the user interface. Here, each line includes a document status identifier 331 as well as other document details. In addition, the software application displays an interactive element 332 that corresponds to a recommended action to be performed with respect to a current reporting period (i.e., May). Here, the machine learning model recommends to include an invoice with document ID 111114 from a future reporting period (June) within the current reporting period (May). Here, the user may select the interactive element 334 that is in the same line as the document ID 111114. In response, the host platform 320 may capture the line item details 336 (e.g., Status, Document ID, Type, Fiscal Year, Reporting Due Date, Confidence, Predicted Date, etc.) and store this data in the log file 322 including an identifier of the user's approval of the suggested change. This data can then be used to train the machine learning model. That is, the model may learn from line items of data captured from the user interface 330 or the like.

Figure 4:
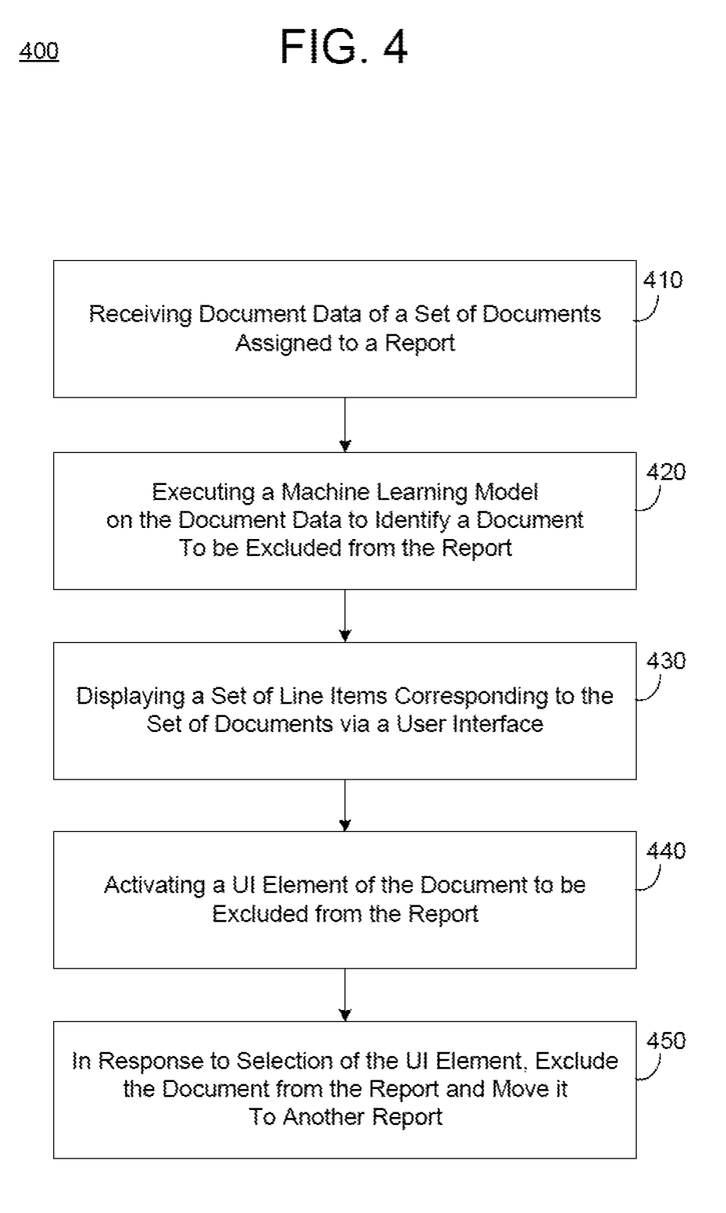
FIG. 4 is a diagram illustrating a method of modifying a set of documents of a report via machine learning in accordance with an example embodiments.

FIG. 4 illustrates a method 400 of modifying a set of documents of a report via machine learning in accordance with an example embodiments. As an example, the method 400 may be performed by a cloud platform, a web server, an on-premises server, a user device, a database, a combination of devices, and the like. Referring to FIG. 4, in 410, the method may include receiving document data of a set of documents assigned to a report among a plurality of different reports within a software application. The document data may include line item data such as shown of a plurality of documents, where each line may represent a different document, etc.

In 420, the method may include executing the machine learning model on the received document data, wherein the machine learning model identifies a document assigned to the set of documents that is to be excluded from the report based on historical document exclusions from other reports. It should also be appreciated that the machine learning model may identify a document or multiple documents that are assigned to different reporting periods that are to be included in the current reporting period. This may be performed simultaneously with the decision on whether to exclude documents. As another example, the determination of whether to include a document into the current reporting period may be performed by itself or separately from the determination to include documents.

In 430, the method may include displaying, via a user interface, a set of line items corresponding to the set of documents with details of the set of documents, respectively. In 440, the method may include activating a user interface element of the identified document within a line item of the identified document displayed within the user interface. In response to detecting a selection of the activated user interface element via the user interface, in 450 the method may include accepting the exclusion of the identified document from the report and moving the identified document to a different report within the software application. Although not shown in 450, it should also be appreciated that the user may accept the inclusion of an identified document instead of or in addition to accepting the exclusion of an identified document. In other words, the method can be used to identify documents to exclude, include, or identify both first subset of documents to include and second subset of documents to exclude.

In some embodiments, the accepting may include updating a due date of the identified document to a due date of the report within an application storage of the software application based on the detected selection of the active user interface element. In some embodiments, the machine learning model may further identify a second document assigned to a second set of documents that is to be included in the set of documents of the report based on historical document inclusions. In some embodiments, the method may further include activating a second user interface element within a line item of the second identified document displayed within the user interface, and in response to selection of the second user interface element, accept the inclusion of the document within the report, and move the identified document to the report within the software application.

In some embodiments, the method may further include storing a description of the accepted exclusion of the document from the report within a log file of a host platform. In some embodiments, the machine learning model may be configured to identify the document to be excluded based on document data attributes included in a line item of the identified document. In some embodiments, the method may further include activating a plurality of user interface elements corresponding to a plurality of documents determined by the machine learning model for exclusion or inclusion with respect to the report, and displaying an accept all button via the user interface. In response detecting selection of the accept all button via the user interface, the method may further include accepting exclusion or inclusion of each document from among the plurality of documents with respect to the report.

Figure 5:
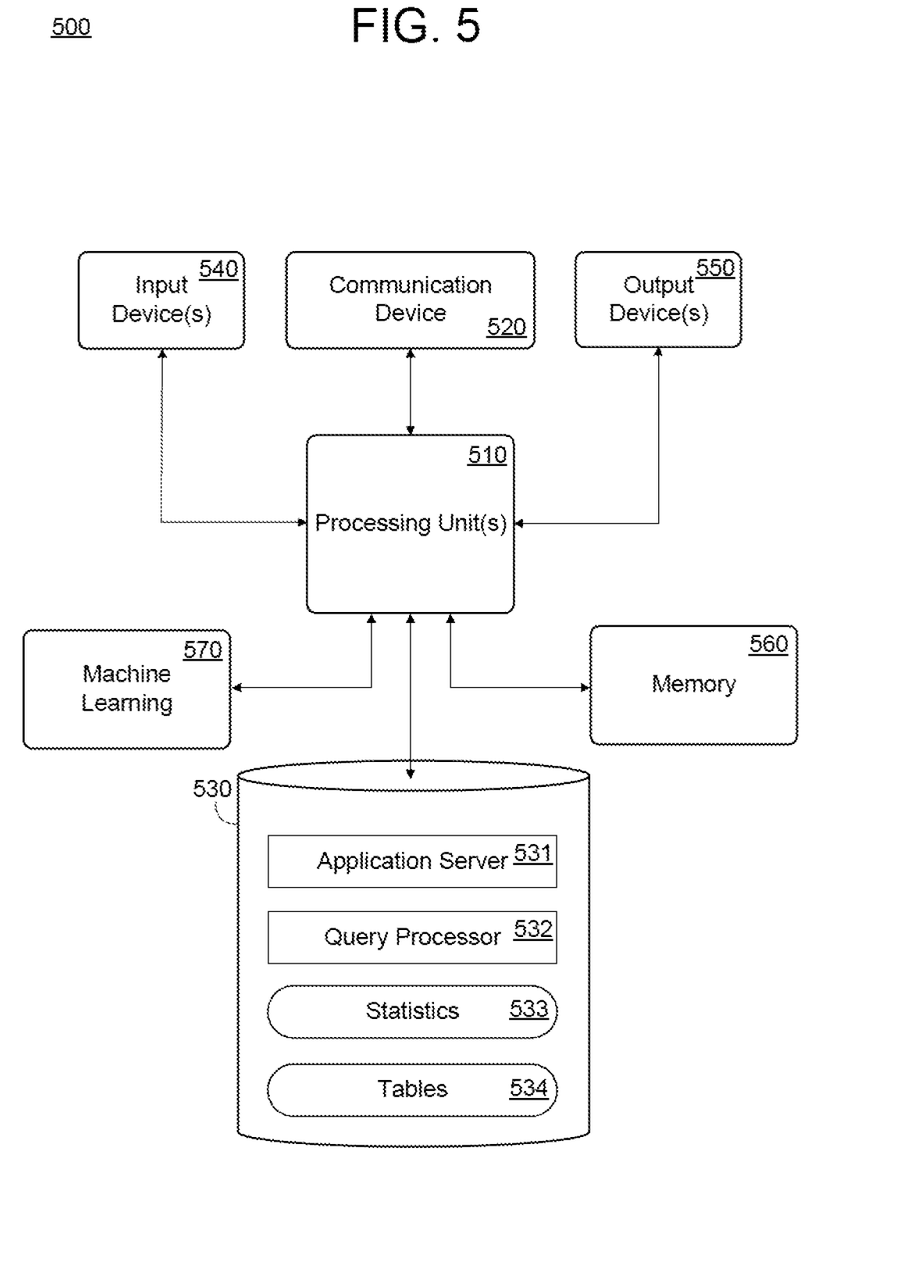

FIG. 5 is a diagram of a server node 500 according to some embodiments. The server node 500 may include a general-purpose computing apparatus and may execute program code to perform any of the functions described herein. For example, the server node 500 may be host to the reporting software application described herein. The server node 500 may include an implementation of a remote terminal or a host platform such as an application server, in some embodiments. It should also be appreciated that the server node 500 may include other elements that are not depicted in the drawing and may not include all of the elements shown in the drawing. The server node 500 may perform the method 400 shown in FIG. 4.

Server node 500 includes processing unit(s) 510 (i.e., processors) operatively coupled to communication device 520, data storage device 530, input device(s) 540, output device(s) 550, and memory 560. Communication device 520 may facilitate communication with external devices, such as an external network or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into the server node 500. Output device (s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM). In some embodiments, the data storage device 530 may store user interface elements in tabular form. For example, one or more columns and one or more rows of user interface elements may be displayed in a two-dimensional spreadsheet, table, document, digital structure, or the like.

Application server 531 and query processor 532 may each comprise program code executed by processing unit(s) 510 to cause server node 500 to perform any one or more of the processes described herein. Such processes may include displaying user interfaces and activating/deactivating user interface elements as described herein. As another example, the query processor 532 may query underlying statistics 533 and tables 534 of data such as input data for the machine learning model described herein and input the returned data into the model. Embodiments are not limited to execution of these processes by a single computing device. In some embodiments, the data storage device 530 may also store data and other program code for providing additional functionality and/or which are necessary for operation of server node 500, such as device drivers, operating system files, etc.

According to various embodiments, the server node 500 may also store one or more machine learning models via a machine learning service 570. The machine learning service may be called by the processing unit(s) 510 to perform a prediction based on input data that is retrieved from the memory 560, the data storage device 530, or any other device including a user interface displayed by the processing unit(s) 510. The machine learning service 570 may predict whether a document should be included or excluded in a set of documents assigned to a report/reporting period within a software application. If a user accepts such recommendations, the processing unit(s) 510 may adjust the documents within the software application and assign them to different reports.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
 a processor configured to
  receive document data of a set of documents assigned to a report among a plurality of different reports within a software application;

execute a machine learning model on the received document data, wherein the machine learning model identifies a document assigned to the set of documents that is to be excluded from the report based on historical document exclusions from other reports;

display, via a user interface, a set of line items corresponding to the set of documents with details of the set of documents, respectively;

activate a user interface element of the identified document within a line item of the identified document displayed within the user interface;

in response to detecting a selection of the active user interface element via the user interface, accepting the exclusion of the identified document from the report and move the identified document to a different report within the software application; and activate a plurality of user interface elements corresponding to a plurality of documents determined by the machine learning model for exclusion with respect to the report, and display an accept all button via the user interface, wherein, in response to detecting a selection of the accept all button via the user interface, the processor is configured to accept exclusion of each document from among the plurality of documents with respect to the report.

2. The computing system of claim 1, wherein the processor is further configured to automatically update a due date of the identified document to a due date of the report within an application storage of the software application based on the detected selection of the active user interface element.

3. The computing system of claim 1, wherein the machine learning model further identifies a second document assigned to a second set of documents that is to be included in the set of documents of the report based on historical document inclusions.

4. The computing system of claim 3, wherein the processor is further configured to activate a second user interface element within a line item of the second identified document displayed within the user interface, accept the inclusion of the document within the report, and move the identified document to the report within the software application.

5. The computing system of claim 1, wherein the processor is configured to store a description of the accepted exclusion of the document from the report within a log file of a host platform.

6. The computing system of claim 1, wherein the machine learning model is configured to identify the document to be excluded based on document data attributes included in a line item of the identified document.

7. A method comprising:
receiving document data of a set of documents assigned to a report among a plurality of different reports within a software application;

executing a machine learning model on the received document data, wherein the machine learning model identifies a document assigned to the set of documents that is to be excluded from the report based on historical document exclusions from other reports;

displaying, via a user interface, a set of line items corresponding to the set of documents with details of the set of documents, respectively;

activating a user interface element of the identified document within a line item of the identified document displayed within the user interface;

in response to detecting a selection of the activated user interface element via the user interface, accepting the exclusion of the identified document from the report and moving the identified document to a different report within the software application; and activating a plurality of user interface elements corresponding to a plurality of documents determined by the machine learning model for exclusion with respect to the report, and displaying an accept all button via the user interface, wherein, in response to detecting a selection of the accept all button via the user interface, the method further includes accepting exclusion of each document from among the plurality of documents with respect to the report.

8. The method of claim 7, wherein the accepting further comprises updating a due date of the identified document to a due date of the report within an application storage of the software application based on the detected selection of the active user interface element.

9. The method of claim 7, wherein the machine learning model further identifies a second document assigned to a second set of documents that is to be included in the set of documents of the report based on historical document inclusions.

10. The method of claim 9, wherein the method further comprises activating a second user interface element within a line item of the second identified document displayed within the user interface, and in response to selection of the second user interface element, accept the inclusion of the document within the report, and move the identified document to the report within the software application.

11. The method of claim 7, wherein the method further comprises storing a description of the accepted exclusion of the document from the report within a log file of a host platform.

12. The method of claim 7, wherein the machine learning model is configured to identify the document to be excluded based on document data attributes included in a line item of the identified document.

13. A computing system comprising:
a processor configured to
receive document data of a set of documents assigned to different reports within a software application;

execute a machine learning model on the received document data, wherein the machine learning model identifies a document assigned to a first report with a first set of documents that is to be included in a second report with a second set of documents based on historical document inclusions from other reports;

display, via a user interface, a set of line items corresponding to the second set of documents with details of the second set of documents, respectively, and a line item of the identified document to be included in the second report;

activate a user interface element of the identified document within the line item of the identified document displayed within the user interface;

in response to detecting a selection of the active user interface element via the user interface, accepting the inclusion of the identified document within the second report and move the identified document to the second report within the software application; and activate a plurality of user interface elements corresponding to a plurality of documents determined by the machine learning model for inclusion with respect to the second report, and display an accept all button via the user interface, wherein, in response to detecting a selection of the accept all button via the user interface, the processor is configured to accept inclusion of each document from among the plurality of documents with respect to the second report.

14. The computing system of claim 13, wherein the processor is further configured to automatically update a due date of the identified document to a due date of the second report within an application storage of the software application based on the detected selection of the active user interface element.

15. The computing system of claim 13, wherein the machine learning model further identifies a second document assigned to the second set of documents in the second report that is to be excluded from the second set of documents of the second report and included in a different report based on historical document exclusions of other reports.

16. The computing system of claim 15, wherein the processor is further configured to activate a second user interface element within a line item of the second identified document displayed within the user interface, accept the exclusion of the document within the second report, and move the identified document to the different report within the software application.

17. A non-transitory computer-readable medium comprising instructions which when executed by a processor cause a computer to perform a method comprising:
receiving document data of a set of documents assigned to a report among a plurality of different reports within a software application;
executing a machine learning model on the received document data, wherein the machine learning model identifies a document assigned to the set of documents that is to be excluded from the report based on historical document exclusions from other reports;
displaying, via a user interface, a set of line items corresponding to the set of documents with details of the set of documents, respectively;
activating a user interface element of the identified document within a line item of the identified document displayed within the user interface;
in response to detecting a selection of the activated user interface element via the user interface, accepting the exclusion of the identified document from the report and moving the identified document to a different report within the software application; and
activating a plurality of user interface elements corresponding to a plurality of documents determined by the machine learning model for exclusion with respect to the report; and
displaying an accept all button via the user interface, wherein, in response to detecting a selection of the accept all button via the user interface, the method further includes accepting exclusion of each document from among the plurality of documents with respect to the report.

18. The non-transitory computer-readable medium of claim 17, wherein the accepting further comprises updating a due date of the identified document to a due date of the report within an application storage of the software application based on the detected selection of the active user interface element.

19. The non-transitory computer-readable medium of claim 17, wherein the machine learning model further identifies a second document assigned to a second set of documents that is to be included in the set of documents of the report based on historical document inclusions.

20. The non-transitory computer-readable medium of claim 19, wherein the method further comprises activating a second user interface element within a line item of the second identified document displayed within the user interface, and in response to selection of the second user interface element, accept the inclusion of the document within the report, and move the identified document to the report within the software application.

* * * * *